(12) United States Patent
Qiu et al.

(10) Patent No.: US 12,062,968 B2
(45) Date of Patent: Aug. 13, 2024

(54) SYNCHRONOUS MOTOR

(71) Applicant: Minzhuo Electric Co., Ltd., Foshan (CN)

(72) Inventors: Yixiang Qiu, Foshan (CN); Tao Wan, Foshan (CN)

( * ) Notice: Subject to any disclaimer, the term of this patent is extended or adjusted under 35 U.S.C. 154(b) by 257 days.

(21) Appl. No.: 17/721,816

(22) Filed: Apr. 15, 2022

(65) Prior Publication Data

US 2023/0047983 A1 Feb. 16, 2023

(30) Foreign Application Priority Data

Aug. 16, 2021 (CN) .......................... 202110935060.2

(51) Int. Cl.
| | | |
|---|---|---|
| *H02K 7/116* | (2006.01) | |
| *F16H 1/20* | (2006.01) | |
| *F16H 57/031* | (2012.01) | |
| *F16H 57/04* | (2010.01) | |
| *F16H 35/00* | (2006.01) | |
| *F16H 57/02* | (2012.01) | |

(52) U.S. Cl.
CPC .............. *H02K 7/116* (2013.01); *F16H 1/20* (2013.01); *F16H 57/031* (2013.01); *F16H 57/0427* (2013.01); *F16H 2035/005* (2013.01); *F16H 2057/02034* (2013.01)

(58) Field of Classification Search
CPC . H02K 7/116; F16H 2035/005; F16H 57/031; F16H 57/0427; F16H 2057/02034
See application file for complete search history.

(56) References Cited

FOREIGN PATENT DOCUMENTS

| CN | 103956854 A | * | 7/2014 |
| CN | 203840127 U | | 9/2014 |
| CN | 207853658 U | | 9/2018 |
| CN | 213213265 U | * | 5/2021 |

OTHER PUBLICATIONS

Shangrao Anli Lock Industry Co., Ltd. "Made-in-china.com", Jul. 28, 2011, https://anlilock.en.made-in-china.com/print/XoeEgmqxYSYk/China-Permanent-Magnet-Synchronous-Motor-Micro-Motor.html (Year: 2011).*
CN 210156980 U (Chunjun Jin) Mar. 17, 2020 (full text). [online] [retrieved on Feb. 22, 2024]. Retrieved from: ProQuest Dialog. (Year: 2020).*
CN 213213265 U (Jun-Juan Li) Oct. 15, 2020 (full text). [online] [retrieved on Feb. 22, 2020]. Retrieved from: Clarivate Analytics. (Year: 2020).*

* cited by examiner

*Primary Examiner* — Joseph Brown

(57) ABSTRACT

A synchronous motor, including: an orientation sheet, an orientation gear set, a casing, a rotor, a transmission gear set, an input gear and an output gear set; wherein the orientation sheet is connected with the orientation gear set, and the orientation sheet is provided with a positioning rod, an orientation member and a groove for storing lubricating oil; the bottom surface of the casing is provided with a positioning groove, and the positioning rod is slidably connected with the positioning groove; the rotor is provided inside the casing, the rotor protrudes from the bottom of the casing and is provided with an orientation boss, and the orientation boss bears against the orientation member.

8 Claims, 5 Drawing Sheets

SYNCHRONOUS MOTOR

CROSS REFERENCE TO RELATED APPLICATION

This application claims priority benefit of Chinese Patent Application No. 202110935060.2, filed on Aug. 16, 2021, and the entire contents of which are incorporated herein by reference.

TECHNICAL FIELD

The present disclosure relates to the technical field of motors, in particular to a synchronous motor.

BACKGROUND

With the development of society and the progress of science and technology, a micromotor is widely used in mobile phones, audio-visual products and other fields. Micro synchronous motors are widely used in household appliances, instruments, robots, toys and other fields. Some existing micro synchronous motors usually consist of driving, orientation and transmission parts. The stator pole pieces of the driving part are provided as asymmetric arcs, grooves and flanges. The current of the spiral coil forms a lateral magnetic field, which drives a permanent magnet plane rotor at the bottom to rotate, thus driving a driving gear connected with the rotor to rotate, and then decelerating and increasing the output torque through several intermediate gears. Therefore, the volume of such motor can be, made very small.

However, the noise of the synchronous motor is relatively large due to the friction between the orientation sheet and the gear in use, which limits its application range. In addition, when the orientation mechanism of the synchronous motor is worn out, the existing orientation mechanism structure can only scrap the whole motor, and the wear problem cannot be solved by replacing parts, so that the use cost of the synchronous motor is relatively high.

In addition, the casing of synchronous motor generally comprises a cover plate and a lower casing, and when in use, the inside of the lower casing can be maintained and cleaned by opening the cover plate. The cover plate of the existing synchronous motor is only a plate, which is riveted and pressed together with the lower casing to realize fixation during installation. However, the installation method of the cover plate makes a gap between the cover plate and the lower casing, which leads to poor tightness of the synchronous motor and poor protection effect of the cover plate, thus affecting the protection of internal parts of the synchronous motor.

At the same time, the mounting plates of the existing synchronous motor are directly provided on both sides of the edge of the lower casing, which makes the synchronous motor have the disadvantage of low connection strength, thus affecting the practicability of the synchronous motor.

SUMMARY

The purpose of the present disclosure is to overcome the shortcomings and deficiencies in the prior art and provide a synchronous motor which is compact in structure and has the characteristic of low noise and low use cost, thereby greatly improving the practicability. In addition, the present disclosure further provides a synchronous motor with strong tightness.

In order to achieve the above purpose, the present disclosure is realized by the following technical, scheme: a synchronous motor, comprising an orientation member, an orientation gear set, a casing, a rotor, a transmission gear set, an input gear and an output gear set; wherein the orientation sheet is connected with the orientation gear set, and the orientation sheet is provided with a positioning rod, an orientation member and a groove for storing lubricating oil; the bottom surface of the casing is provided with a positioning groove, and the positioning rod is slidably connected with the positioning groove; the rotor is provided inside the casing, the rotor protrudes from the bottom of the casing and is provided with an orientation boss, and the orientation boss bears against the orientation member; the input gear is coaxially connected with the rotor and meshed with the orientation gear set; the orientation gear set, the transmission gear set and the output gear set are sequentially meshed; and when the rotor drives the output gear set to rotate forward through the input gear, the orientation member bears against the orientation boss to prevent the input gear from rotating reversely, thus realizing the unidirectional rotation of the output gear set.

In the above scheme, according to the present disclosure, the orientation sheet of the present disclosure is provided with a groove for storing lubricating oil, which can greatly reduce noise when used in cooperation with the orientation gear set, thereby improving practicability. In addition, if the parts such as the positioning rod and the orientation sheet provided on the orientation sheet are worn or damaged, the whole orientation sheet can be replaced to solve the problem of scrapping, the whole synchronous motor in the prior art, thereby reducing the use cost of the synchronous motor.

The groove is provided on the side of the orientation sheet facing the orientation gear set; and the groove is annular.

The orientation member is provided on the side of the orientation sheet away from the orientation gear set and protrudes from the orientation sheet.

The positioning rod is provided on the side of the orientation sheet away from the orientation gear set, and the positioning rod and the orientation member are oppositely provided. This design can make the positioning rod be restricted when the orientation sheet bears against the orientation boss of the rotor, and the unidirectional rotation of the orientation gear set can be ensured in the manner of double mechanical locking.

The orientation sheet is provided with a fastener fastened with the orientation gear set, and the fastener is provided in the middle of the orientation sheet; the orientation gear set is provided with a boss, and the orientation gear set is embedded in the fastener through the boss to realize fastening with the orientation sheet. The structure is simple, which can facilitate the assembly and disassembly of the orientation sheet and the orientation gear set.

The casing comprises a cover plate and a lower casing, and the lower casing is provided with an accommodating cavity; the orientation sheet, the orientation gear set, the rotor, the transmission gear set, the input gear and the output gear set are all provided in the accommodating cavity, and the output shaft of the output gear set extends out of the cover plate; the body diameter of the cover plate is greater than or equal to the caliber of the aperture of the lower casing, and the cover plate and the lower casing are crimped to form the casing. The cover plate of the present disclosure can ensure that it is hermetically connected with the lower casing, thereby improving the tightness of the synchronous motor.

Both sides of the cover plate are provided with mounting plates for mounting synchronous motors, and the cover plate and the mounting plates are integrally formed. According to the present disclosure, the mounting plate and the plate body are integrally formed, so that the connection strength of the mounting plate can be improved, and the stability of mounting the synchronous motor can be improved.

The cover plate is provided with several connecting holes to be connected with the lower casing, and the several connecting holes are uniformly distributed along the edge of the cover plate; and the end face of the cover plate at the front end of the connecting hole is provided with a positioning groove. The design of the positioning groove can be used for positioning the connector after being connected with the connecting hole.

The lower casing is provided with several connectors, and the several connectors are uniformly distributed along the edge of the aperture of the lower casing and are provided opposite to the connecting holes; during connection, the connector is crimped after passing through the connecting hole to realize the connection between the cover plate and the lower casing.

The cover plate is provided with a first through hole and a second through hole, and the first through hole is used for the output shaft of the output gear set to extend out; and the second through hole is used to provide clearance for the rotating shaft of the input gear, the rotating shaft of the orientation gear set and the rotating shaft of the transmission gear set.

According to the present disclosure, a coil is further provided inside the casing of the synchronous motor, and the center rod of the rotor is provided inside the casing and in the inner ring of the coil. The rotor is the same as the prior art, using a ring multipolar permanent magnet structure. The working process of the orientation mechanism of the synchronous motor of the present disclosure is as follows.

When the rotor rotates clockwise, the orientation gear set is driven by the input gear to rotate counterclockwise to drive the orientation sheet to rotate counterclockwise, and the positioning rod of the orientation sheet slides in the positioning groove. When the positioning rod is located at the end of the positioning groove, the positioning of the orientation sheet is realized, and the orientation sheet does not rotate counterclockwise with the orientation gear set. At this time the orientation boss of the rotor will not be mechanically stuck by the orientation member. The rotor can drive the orientation gear set to rotate counterclockwise unidirectionally, and then decelerate through other transmission gear sets and drive the output shaft to rotate through the output gear set.

When the rotor rotates counterclockwise, the input gear drives the orientation gear set to rotate clockwise to drive the orientation member to rotate clockwise, and the positioning rod of the orientation member slides in the positioning groove. When the orientation member bears against the orientation boss of the rotor, the rotor cannot rotate counterclockwise due to being stuck by a mechanical force. At this time, the positioning rod is located at the other end of the positioning groove so as to be stuck doubly, so that the orientation gear set cannot rotate clockwise.

The synchronous motor of the present disclosure has a simple structure, and the selective orientation of the synchronous motor can be realized by switching the positions of the orientation sheet and the orientation boss of the rotor: when the orientation member of the orientation sheet is located on the left side of the connection line between the center of the rotor and the axis of the orientation gear set, the rotor can rotate clockwise. When the orientation member of the orientation sheet is located on the right side of the connection line between the center of the rotor and the axis of the orientation gear set, the rotor can rotate counterclockwise. In this way, the forward or reverse rotation of the synchronous motor can be realized according to the needs of customers, and the steering demand of the synchronous motor can be met.

Compared with the prior art, the present disclosure has the following advantages and beneficial effects.

1. The orientation sheet of the synchronous motor of the present disclosure is simple in structure, and can reduce noise when used in cooperation with the gear, thereby improving practicability.

2. The synchronous motor of the present disclosure is compact in structure, and parts can be replaced conveniently, thereby reducing the use cost of the synchronous motor.

3. The cover plate of the synchronous motor of the present disclosure has high connection strength, which can ensure that the cover plate is connected with the lower casing hermetically, thus improving the tightness of the synchronous motor.

In the figures, 1 is an orientation sheet, 2 is an orientation gear set, 3 is a fastener, 4 is a groove, 5 is a positioning rod, 6 is an orientation boss, 7 is an orientation sheet, 8 is a lower casing, 9 is a rotor, 10 is an input gear, 11 is a positioning groove, 12 is a transmission gear set, 13 is an output shaft 14 is an output gear set, 15 is a cover plate, 16 is a mounting plate, 17 is a aperture, 18 is a mounting hole, 19 is a first through hole, 20 is a second through hole, 21 is an accommodating cavity, 22 is a connecting hole, 23 is a positioning groove, 24 is a connector, 25 is a boss, 26 is a casing.

DETAILED DESCRIPTION OF THE EMBODIMENTS

The present disclosure will be described in further detail with reference to the attached drawings and specific embodiments hereinafter.

Embodiment 1

Figure 1:
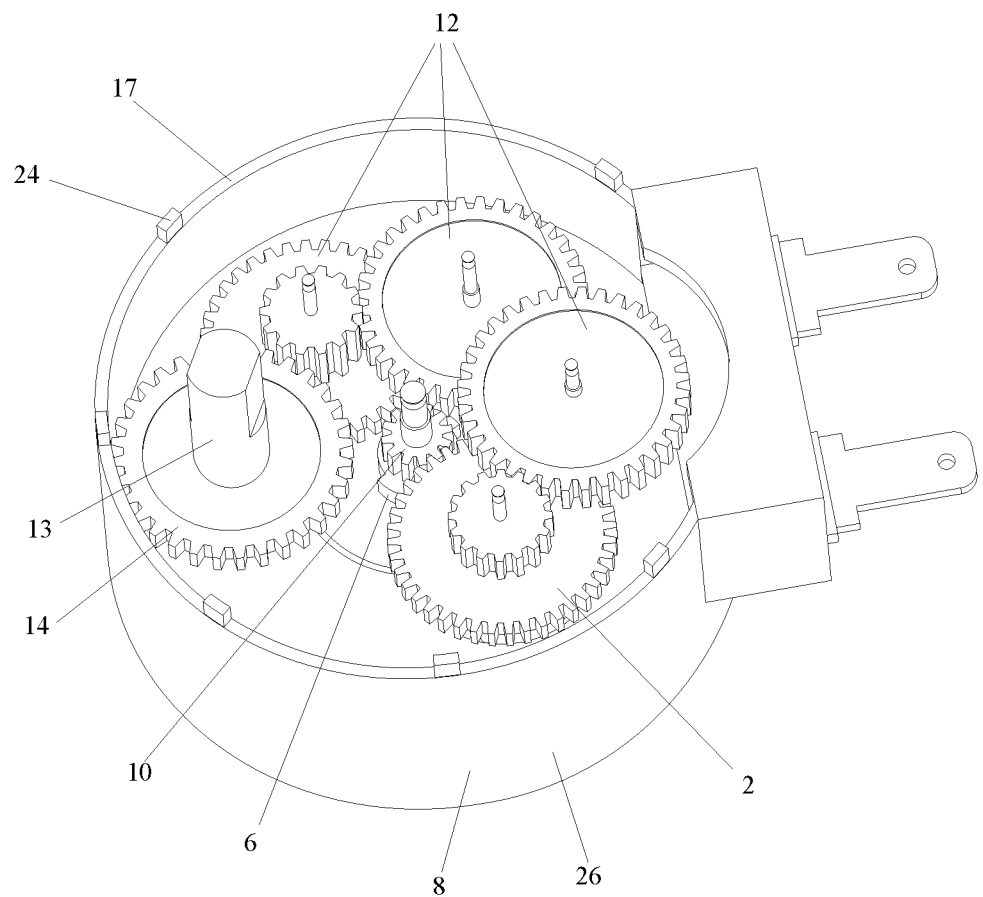
FIG. 1 is an internal schematic diagram of a synchronous motor according to the present disclosure.
Figure 2:
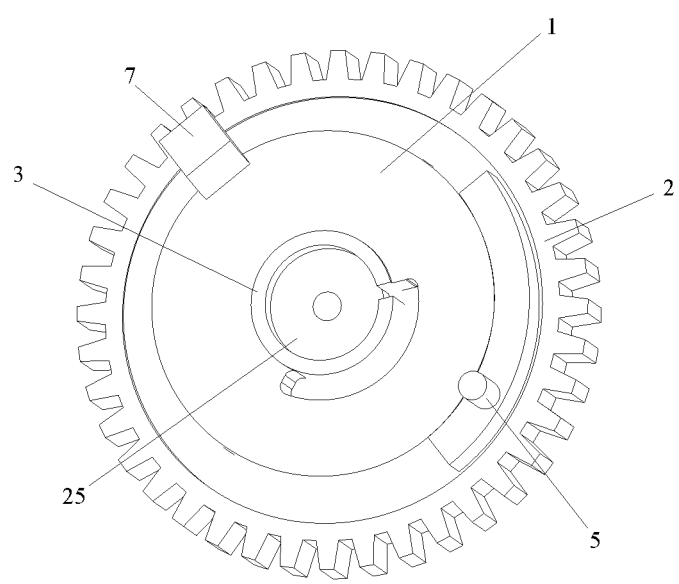
FIG. 2 is a schematic diagram of the connection between an orientation sheet and an orientation gear set according to the present disclosure.
Figure 3:
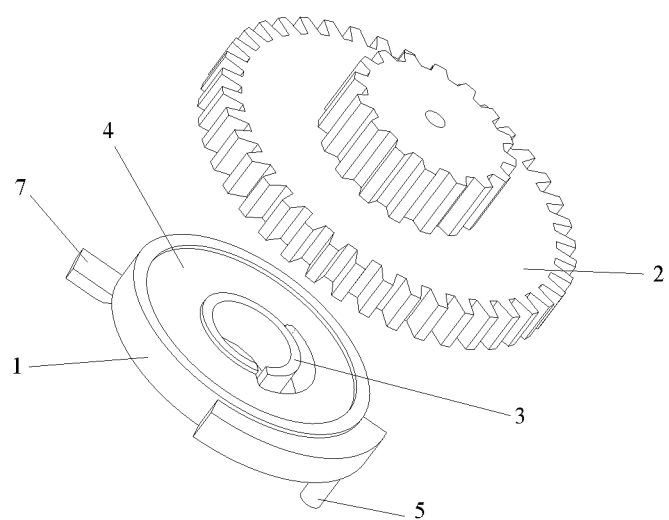
FIG. 3 is an exploded diagram of an orientation sheet and an orientation gear set according to the present disclosure.
Figure 4:
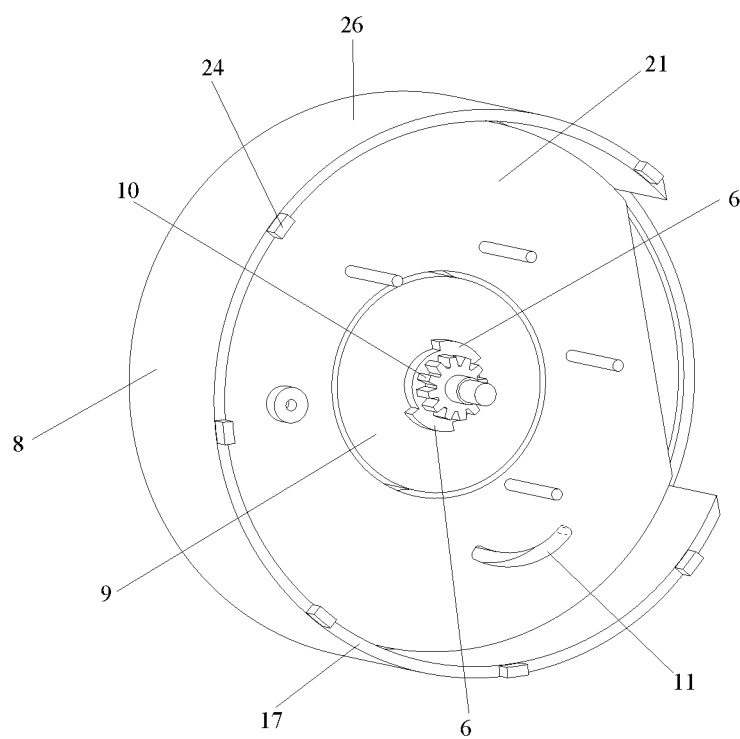
FIG. 4 is a schematic diagram of a lower casing according to the present disclosure.
Figure 5:
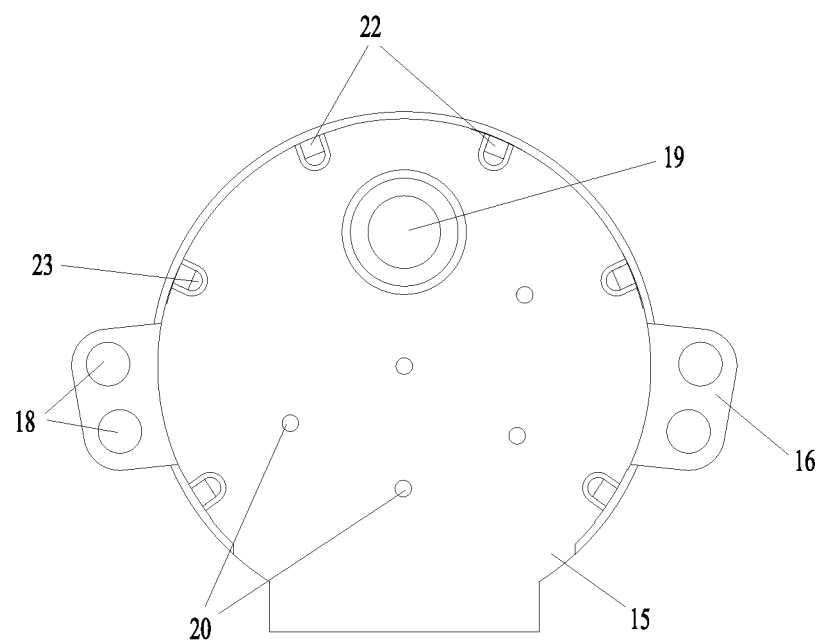
FIG. 5 is a schematic diagram of a cover plate of a synchronous motor according to the present disclosure.

As shown in FIG. 1 to FIG. 5, the synchronous motor of the present disclosure comprises an orientation sheet 1, an orientation gear set 2, a casing 26, a rotor 9, a transmission gear set 12, an input gear 10, an output gear set 14, and an output shaft 13 connected with the output gear set 14, wherein the orientation sheet 1 is connected with the orientation gear set 2, and the orientation sheet 1 is provided with a positioning rod 5, an orientation member 7 and a groove 4 for storing lubricating oil. The bottom surface of the casing 26 is provided with a positioning groove 11, and the positioning rod 5 is slidably connected with the positioning groove 11. The rotor 9 of the present disclosure is provided inside the casing 26, the rotor 9 protrudes from the bottom of the casing 26 and is provided with an orientation boss 6, and the orientation boss 6 bears against the orientation member 7. The input gear 10 is coaxially connected with the rotor 9 and meshed with the orientation gear set 2, while the orientation gear set 2, the transmission gear set 12 and the output gear set 14 are sequentially meshed. When the rotor 9 drives the output gear set 14 to rotate forward through the input gear 10, the orientation member 7 bears against the orientation boss 6 of the rotor 9 to prevent the input gear 10 from rotating reversely, thus realizing the unidirectional rotation of the output shaft 13.

Specifically, the groove 4 is provided on the side of the orientation sheet 1 facing the orientation gear set 2, and the groove 11 is annular. In addition, the orientation member 7 is provided on the side of the orientation sheet 1 away from the orientation gear set 2 and protrudes from the orientation sheet 1. The positioning rod 5 is provided on the side of the orientation sheet 1 away from the orientation gear set 2, and the positioning rod 5 and the orientation member 7 are oppositely provided. This design enables the positioning rod 5 to be restricted when the orientation member 7 bears against the orientation boss 6 of the rotor 9, and the unidirectional rotation of the orientation gear set 2 can be ensured in the manner of double mechanical locking.

In order to facilitate the assembly and disassembly of the orientation sheet 1 and the orientation gear set 2, the orientation sheet 1 is provided with a fastener 3 fastened with the orientation gear set 2, and the fastener 3 is provided in the middle of the orientation sheet 1. The orientation gear set 2 is provided with a boss 25, and the orientation gear set 2 is embedded in the fastener 3 through the boss 25 to realize fastening with the orientation sheet 1.

According to the present disclosure, the casing 26 comprises a cover plate 15 and a lower casing 8, and the lower casing 8 is provided with an accommodating cavity 21. The orientation sheet 1, the orientation gear set 2, the rotor 9, the transmission gear set 12, the input gear 10 and the output gear set 14 are all provided in the accommodating cavity 21, and the output shaft 13 of the output gear set 14 extends out of the cover plate 15. The body diameter of the cover plate 15 is greater than or equal to the caliber of the aperture 17 of the lower casing 8, and the cover plate 15 and the lower casing 8 are crimped to form the casing 26, so that the cover plate 15 and the lower casing 8 can be hermetically connected, thereby improving the tightness of the synchronous motor.

According to the present disclosure, both sides of the cover plate 15 are provided with mounting plates 16 for mounting synchronous motors, mounting holes 18 for convenient installation are provided on the mounting plates 16, and the cover plate 15 and the mounting plates 16 are integrally formed. The cover plate 15 is provided with several connecting holes 22 to be connected with the lower casing 8, and the several connecting holes 22 are uniformly distributed along the edge of the cover plate 15. The end face of the cover plate 15 at the front end of the connecting hole 22 is provided with a positioning groove 23. The above-mentioned cover plate 15 and the lower casing 8 are crimped to form a casing, which means that the lower casing 8 is provided with several connectors 24, and the several connectors 24 are uniformly distributed along the edge of the aperture 17 of the lower casing 8 and are provided opposite to the connecting holes 22; during connection, the connector 24 is crimped after passing through the connecting hole 22 to realize the connection between the cover plate 15 and the lower casing 8. The cover plate 15 is provided with a first through hole 19 and a second through hole 20, and the first through hole 19 is used for the output shaft 13 of the output gear set 14 to extend out; and the second through hole 20 is used to provide clearance for the rotating shaft of the input gear 10, the rotating shaft of the orientation gear set 2 and the rotating shaft of the transmission gear set 12.

According to the present disclosure, a coil is further provided inside the lower casing 8 of the synchronous motor, and the center rod of the rotor 9 is provided inside the casing 8 and in the inner ring of the coil. The rotor 9 is the same as, the prior art, using a ring multipolar permanent magnet structure. The working process of the orientation mechanism of the synchronous motor of the present disclosure is as follows.

When the rotor 9 rotates clockwise, the orientation gear set 2 is driven by the input gear 10 to rotate counterclockwise to drive the orientation sheet 1 to rotate counterclockwise, and the positioning rod 5 of the orientation sheet 1 slides in the positioning groove 11. When the positioning rod 5 is located at the end of the positioning groove 11, the positioning of the orientation sheet 1 is realized, and the orientation sheet 1 does not rotate counterclockwise with the orientation gear set 2. At this time, the orientation boss 6 of the rotor 9 will not be mechanically stuck by the orientation member 7. The rotor 9 can drive the orientation gear set 2 to rotate counterclockwise unidirectionally, and then decelerate through other transmission gear sets 12 and drive the output shaft 13 to rotate through the output gear set 14, thus realizing the unidirectional rotation of the synchronous motor.

When the rotor 9 rotates counterclockwise, the input gear 10 drives the orientation gear set 2 to rotate clockwise to drive the orientation member 1 to rotate clockwise, and the positioning rod 5 of the orientation member 1 slides in the positioning groove 11. When the orientation member 7 bears against the orientation boss 6 of the rotor 9, the rotor 9 cannot rotate counterclockwise due to being stuck by a mechanical force. At this time, the positioning rod 5 is located at the other end of the positioning groove 11 so as to be stuck doubly, so that the orientation gear set 2 cannot rotate clockwise.

The synchronous motor of the present disclosure has a simple structure, and the selective orientation of the synchronous motor can be realized by switching the positions of the orientation sheet 1 and the orientation boss 6 of the rotor 9: when the orientation member 7 of the orientation sheet 1 is located on the left side of the connection line between the center of the rotor 9 and the axis of the orientation gear set 2, the rotor 9 can rotate clockwise. When the orientation member 7 of the orientation sheet 1 is located on the right side of the connection line between the center of the rotor 9 and the axis of the orientation gear set 2, the rotor 9 can rotate counterclockwise. In this way, the forward or reverse rotation of the synchronous motor can be realized according to the needs of customers, and the steering demand of the synchronous motor can be met.

Embodiment 2

The only difference between this embodiment and embodiment 1 is that the cover plate 15 and the lower casing 8 are crimped to form the casing 26 of the synchronous motor, which means that the edge of the aperture of the lower casing 8 is crimped with the cover body 15 to realize the connection between the cover plate 15 and the lower casing 8.

Other structures of this embodiment are the same as those of embodiment 1.

The above embodiments are the preferred embodiments of the present disclosure, but the embodiments of the present disclosure are not limited by the above embodiments. Any other changes, modifications, substitutions, combinations and simplifications that do not deviate from the spirit and principle of the present disclosure should be equivalent replacement methods, which are included in the scope of protection of the present disclosure.

What is claimed is:

1. A synchronous motor, comprising an orientation sheet (1), an orientation gear set (2), a casing (26), a rotor (9), a transmission gear set (12), an input gear (10) and an output gear set (14); wherein the orientation sheet (1) is connected with the orientation gear set (2), and the orientation sheet (1) is provided with a positioning rod (5), an orientation member (7) and a groove (4) for storing lubricating oil; a bottom surface of the casing (26) is provided with a positioning groove (11), and the positioning rod (5) is slidably connected with the positioning groove (11); the rotor (9) is provided inside the casing (26), the rotor (9) protrudes from the bottom of the casing (26) and is provided with an orientation boss (6), and the orientation boss (6) bears against the orientation member (7); the input gear (10) is coaxially connected with the rotor (9) and meshed with the orientation gear set (2); the orientation gear set (2), the transmission gear set (12) and the output gear set (14) are sequentially meshed; and when the rotor (9) drives the output gear set (14) to rotate forward through the input gear (10), the orientation member (7) bears against the orientation boss (6) to prevent the input gear (10) from rotating reversely, thus realizing the unidirectional rotation of the output gear set (14),
wherein the orientation member (7) is provided on a side of the orientation sheet (1) away from the orientation gear set (2) and protrudes from the orientation sheet (1),
wherein the positioning rod (5) is provided on the side of the orientation sheet (1) away from the orientation gear set (2), and the positioning rod (5) and the orientation member (7) are oppositely provided.

2. The synchronous motor according to claim 1, wherein the groove (4) is provided on a side of the orientation sheet (1) facing the orientation gear set (2); and the groove (4) is annular.

3. The synchronous motor according to claim 1, wherein the orientation sheet (1) is provided with a fastener (3) fastened with the orientation gear set (2), and the fastener (3) is provided in a middle of the orientation sheet (1); the orientation gear set (2) is provided with a boss (25), and the orientation gear set (2) is embedded in the fastener (3) through the boss (25) to realize fastening with the orientation sheet (1).

4. The synchronous motor according to claim 1, wherein the casing (26) comprises a cover plate (15) and a lower casing (8), and the lower casing (8) is provided with an accommodating cavity (21); the orientation sheet (1), the orientation gear set (2), the rotor (9), the transmission gear set (12), the input gear (10) and the output gear set (14) are all provided in the accommodating cavity (21), and an output shaft (13) of the output gear set (14) extends out of the cover plate (15); a body diameter of the cover plate (15) is greater than or equal to a caliber of the aperture (17) of the lower casing (8), and the cover plate (15) and the lower casing (8) are crimped to form the casing (26).

5. The synchronous motor according to claim 4, wherein both sides of the cover plate (15) are provided with mounting plates (16) for mounting, and the cover plate (15) and the mounting plates (16) are integrally formed.

6. The synchronous motor according to claim 4, wherein the cover plate (15) is provided with several connecting holes (22) to be connected with the lower casing (8), and the several connecting holes (22) are uniformly distributed along an edge of the cover plate (15); and an end face of the cover plate (15) at a front end of the connecting hole (22) is provided with a positioning groove (23).

7. The synchronous motor according to claim 6, wherein the lower casing (8) is provided with several connectors (24), and the several connectors (24) are uniformly distributed along an edge of the aperture (17) of the lower casing (8) and are provided opposite to the connecting holes (22); during connection, the connector (24) is crimped after passing through a connecting hole (22) to realize the connection between the cover plate (15) and the lower casing (8).

8. The synchronous motor according to claim 4, wherein the cover plate (15) is provided with a first through hole (19) and a second through hole (20), and the first through hole (19) is used for the output shaft (13) of the output gear set (14) to extend out; and the second through hole (20) is used to provide clearance for a rotating shaft of the input gear (10), a rotating shaft of the orientation gear set (2) and a rotating shaft of the transmission gear set (12).

* * * * *